G. JOHNSON.
Valves for Hydraulic Engines, &c.

No. 212,556. Patented Feb. 25, 1879.

ATTEST.
W. Anderson Jr
Arthur C. Fraser.

INVENTOR.
Geo. Johnson
Per his attys.
Burke, Fraser & Connett

UNITED STATES PATENT OFFICE.

GEORGE JOHNSON, OF CINCINNATI, OHIO.

IMPROVEMENT IN VALVES FOR HYDRAULIC ENGINES, &c.

Specification forming part of Letters Patent No. 212,556, dated February 25, 1879; application filed July 10, 1878.

*To all whom it may concern:*

Be it known that I, GEORGE JOHNSON, of Cincinnati, in the county of Hamilton and State of Ohio, have invented certain Improvements in Valves, of which the following is a specification:

My invention relates to valves used chiefly for controlling the supply of water to hydraulic engines, elevators, fire-plugs, and similar apparatus, though applicable to many other uses, in which the fluid passes through apertures or ports in the valve-seat, and is cut off by covering the seat with a sheet or band of leather, rubber, or other flexible material.

My invention consists in the employment of a movable valve-seat, in combination with the flexible band, one end of which is attached to the valve-seat, and the other or free end to a device for taking up its slack when the valve is open, the valve-seat and take-up device moving in unison during the operation of the valve; also, in the employment of a moving valve-seat having a curved convex apertured face, upon which the flexible band is wound to close the valve; also, in making the said valve-seat of tubular form, and capable of oscillatory motion in fixed bearings, with apertures through its periphery for the admission of fluid, and an outlet for the same through one of its trunnions; also, in the employment, as the take-up device, of a winding-drum, to carry the slack portion of the band when the valve is open; and, also, in various arrangements and combinations of parts, which will be hereinafter described.

Figure 1:
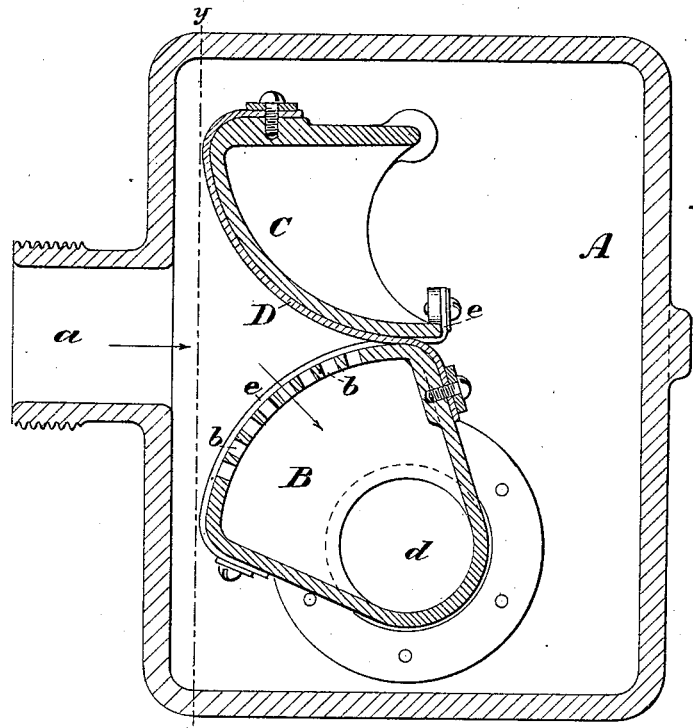
Figure 2:
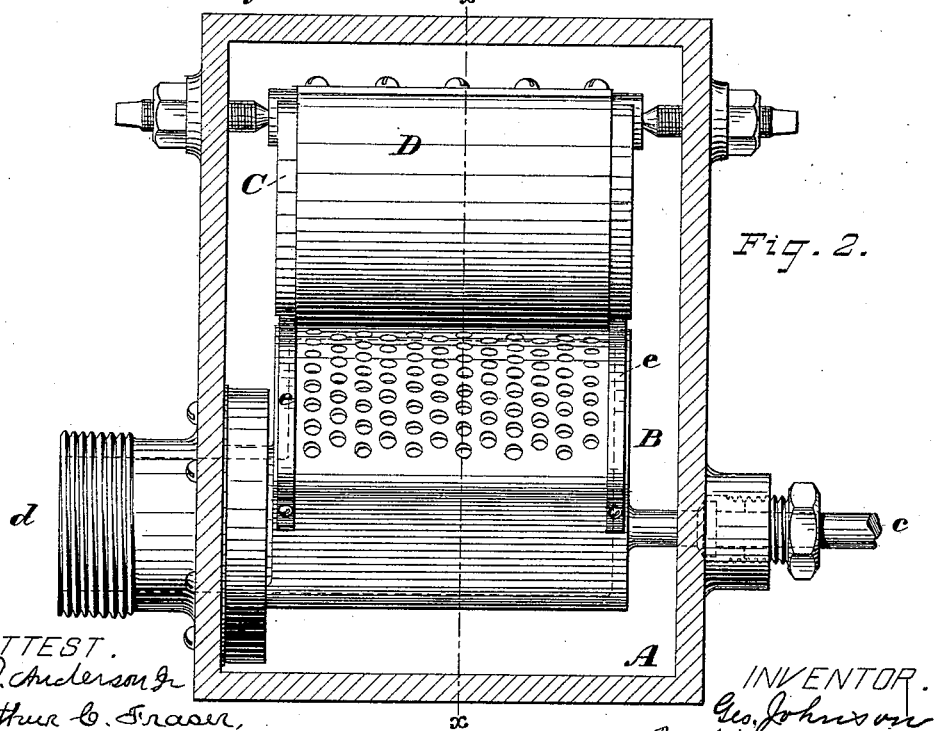

In the drawings, Figure 1 is a vertical mid-section of the preferred form of my improved valve, taken in the plane of the line $x\, x$; and Fig. 2 is a longitudinal section taken in the plane of the line $y\, y$, and showing the working parts in elevation.

In the precise construction shown in the drawings, A represents the valve-chamber, provided with an inlet, $a$. B is the valve-seat, shown as hollow, with a curved face, in which are a series of apertures or ports, $b\, b$, for the passage of the fluid from its exterior to its interior. The combined area of these apertures should somewhat exceed that of the inlet-opening $a$.

The valve-seat B is suitably journaled in the sides of the valve-chamber to allow it sufficient rotatory or oscillatory movement to effect the opening and closing of the valve. It is operated through the packed stem or spindle $c$, (shown broken off in Fig. 2,) to the end of which may be fixed a hand-wheel, lever, or other device for communicating motion. At the bearing opposite to the stem $c$ is provided, through the trunnion, an outlet, $d$, for the passage of the fluid from the interior of the valve-seat B to the point where it is to be used. This curve-faced oscillating valve-seat takes the place of the flat fixed seat heretofore used in valves of this character.

A take-up device, C, is arranged opposite the valve-seat B, and is adapted to move in unison with it when operating the valve.

D is a broad band of leather or equivalent flexible material, forming the port-cover or valve proper, which is secured at one end to the valve-seat B and at the other to the take-up C. The band D is so arranged with reference to the seat B that by the rotation of the latter the former is wound upon it, so as to cover the ports $b\, b$ and close the valve.

The take-up C may be, as shown, a drum or segment of a drum, cylindrical or otherwise, and be so pivoted or journaled between the walls of the chamber A as to be free to rotate or oscillate therein. In opening the valve, as the valve-seat revolves and unwinds the band or port-cover D, the take-up or drum C also revolves in the same direction, and winds upon itself the slack or free portion of the band, and thus not only keeps it taut, but holds the free end out of contact with the valve-seat, and out of the way of the current of fluid passing through the valve. The band or cover D is sufficiently pliable to be wound upon either surface.

When the valve is open, as shown in the drawings, the band or port-cover D, being wound upon the take-up drum C, leaves the surface of the valve-seat unobstructed, and permits the free passage of the water or other fluid through the inlet $a$ and apertures $b\ b$ into the interior of the valve-seat, and thence out at the outlet $d$, as shown by the arrows.

When the valve is to be closed, a partial revolution of the stem $c$ will rotate the valve-seat B sufficiently to unwind the flexible band or cover D from the drum C onto the valve-seat B, thereby covering the apertures in the latter and shutting off the fluid.

As the band D unwinds from the drum C, it necessarily rotates the latter a certain distance. To cause it to retrace this movement when the valve is being opened, I prefer to employ one or more narrow straps, $e\ e$, of leather, or other suitable material, fixed at one end to B, and at the other to C, as shown, so that by winding upon their curved faces in the same manner as the band D, but oppositely arranged, they draw the drum back to its place and keep the band D taut.

In lieu of this device, the parts B and C may be connected by cogs and gears, so as to rotate in unison; or the drum C may be brought back by a spring; or its return motion may be effected in any other manner, as found desirable.

I have in the drawings shown the parts B and C in the form of segments of cylinders, instead of complete cylinders, as in the precise form of valve illustrated. A segment accomplishes all that a complete cylinder could effect, and takes up less room. I contemplate, however, the use of two complete cylinders, or of one complete or one segmental cylinder, of the same or different diameters, arranged to operate together in unison, as described. In case two complete cylinders are used, the band or port-cover may be fixed at both ends to one of them, and the bight or loop passed over the other, which becomes simply an idler or supporting-drum. When arranged in this way no additional device is necessary to effect the return rotation of the take-up cylinder, and the inlet $a$ opens preferably between the two cylinders and parallel with their axes.

In lieu of the drum C, the take-up may consist of an arm or lever, pivoted at one end in the same manner as the drum shown, and secured at its other to the free end of the band D, and be acted upon by a spring or gearing in such a manner as to take up the slack of the band and keep it taut, and, when the valve is open, to hold the band out of contact with the valve-seat.

When a greater area of outlet is desired, the drum C may be utilized as a valve-seat, also, and be made hollow, and be provided with apertures $b\ b$ and outlet $d$, the same as the valve-seat B. The apertures may in such case be arranged either on the opposite side of the drum, so as not to interfere with its functions as take-up, or the straps $e\ e$ may be made broader, and the apertures arranged under them, as desired.

In hydraulic elevators it is frequently desirable to use an additional cylinder and piston to meet extra heavy loads, and in such case it has been customary to operate it by a second valve. My valve, when modified as above described, may be adapted to operate this additional cylinder by connecting the latter with the outlet from the drum C, and so placing the apertures in said drum that they will not be uncovered until after the valve-stem has been rotated a certain distance, while the apertures in the valve-seat B will be uncovered before reaching that point.

My valve operates noiselessly, smoothly, and easily, being perfectly balanced, and having no friction except at the bearings. Its operation as a hydraulic valve produces no shock or hammering in the pipes, for the reason that it shuts off the water gradually, and that the yielding of the elastic leather band reduces the strain on the rigid parts.

I am aware that valves have been long known in which a plane perforated fixed valve-seat has been employed, closed by a flexible band, unwound upon it from a segment of a drum moving or rolling across its face, and I make no claim to such construction.

What I claim as my invention is—

1. A valve having a movable apertured valve-seat, a flexible band or port-cover secured at one end to said seat, and a take-up device, the whole being operated simultaneously by the movement of the valve-seat, substantially as set forth.

2. In a valve in which the fluid passes through apertures or ports in the valve-seat, and is cut off by covering the seat with a flexible band or port-cover, a movable valve-seat having a rotund convex face, on which the port-cover is spread by the movement of the seat, substantially as set forth.

3. The hollow valve-seat B, journaled in the walls of the valve-chamber A, and adapted to oscillate therein, provided with apertures or ports $b\ b$, to admit the fluid to its interior, and an outlet, $d$, for the same through one of its trunnions, substantially as set forth.

4. The combination of a hollow apertured valve-seat, B, and take-up drum C, both free to rotate or oscillate in bearings in the chamber A, with the flexible band or port-cover D, attached at one end to B and at the other to C, and adapted to be unwound from one to the other in operating the valve, substantially as shown and described.

5. In a valve having oscillating valve-seat B, take-up drum C, and flexible port-cover D, arranged substantially as set forth, the device for effecting the return motion of the idler drum or port, consisting of one or more flexible straps, $e\ e$, arranged and operating substantially as shown and described.

6. The combination of valve-chamber A, inlet $a$, hollow valve-seat B, provided with apertures or ports $b\ b$ and outlet $d$, flexible port-cover D, and take-up drum C, arranged and operating to form a valve, substantially as set forth.

7. A hollow valve-seat, B, provided with an outlet, $d$, and inlet-ports $b\ b$, in combination with a flexible port-cover, D, adapted to be wound upon it by its rotatory movement to close the valve, and some suitable take-up device, as C, moving in unison with the valve-seat, to hold the port-cover out of contact with the latter when the valve is open, substantially as set forth.

In witness whereof I have hereunto signed my name in the presence of two subscribing witnesses.

GEORGE JOHNSON.

Witnesses:
ARTHUR C. FRASER,
HENRY CONNETT.